US012630045B2

(12) United States Patent
Miyazaki et al.

(10) Patent No.: US 12,630,045 B2
(45) Date of Patent: May 19, 2026

(54) SERVER, AND METHOD OF ADJUSTING ELECTRIC POWER SUPPLY AND DEMAND DURING CHARGE OR DISCHARGE OF VEHICLE TRAVELS TOWARD A DESTINATION ROUTE

(71) Applicant: TOYOTA JIDOSHA KABUSHIKI KAISHA, Toyota (JP)

(72) Inventors: Taiki Miyazaki, Nagoya (JP); Masami Suganuma, Miyoshi (JP); Hideki Tamoto, Toyota (JP); Akinori Morishima, Naka-gun (JP); Masakazu Motohashi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 367 days.

(21) Appl. No.: 18/482,618

(22) Filed: Oct. 6, 2023

(65) Prior Publication Data

US 2024/0157839 A1 May 16, 2024

(30) Foreign Application Priority Data

Nov. 10, 2022 (JP) ................................. 2022-180396

(51) Int. Cl.
*B60L 53/68* (2019.01)
*B60L 53/66* (2019.01)
(52) U.S. Cl.
CPC .............. *B60L 53/68* (2019.02); *B60L 53/66* (2019.02); *B60L 2240/62* (2013.01); *B60L 2240/70* (2013.01)

(58) Field of Classification Search
CPC ...... B60L 53/68; B60L 53/66; B60L 2240/62; B60L 2240/70
USPC ......................................................... 700/295
See application file for complete search history.

(56) References Cited

U.S. PATENT DOCUMENTS

| | | | |
|---|---|---|---|
| 11,571,986 B2 * | 2/2023 | Kinomura | ......... H02J 13/00022 |
| 2015/0046200 A1 | 2/2015 | Chihara | |
| 2015/0061592 A1 * | 3/2015 | Nakasone | .............. B60L 53/14 |
| | | | 320/109 |

(Continued)

FOREIGN PATENT DOCUMENTS

| | | |
|---|---|---|
| JP | 2012-226416 A | 11/2012 |
| JP | 2019-95196 A | 6/2019 |

(Continued)

*Primary Examiner* — Md Azad
(74) *Attorney, Agent, or Firm* — Sughrue Mion, PLLC

(57) ABSTRACT

A server includes a storage storing data on chargers each configured to charge or discharge electric power to or from a vehicle with an electrical storage device, and a processor configured to send a user of the vehicle a message that makes a proposal to charge or discharge the vehicle by using at least one of the chargers when the vehicle travels toward a destination. The processor is configured to acquire, for each of the chargers, power supply and demand information on power demand or supply in a power grid of a region in which the charger is installed, extract a charger installed in a region with larger power demand or supply than another region from among the chargers based on predetermined information including the power supply and demand information, and send the message that makes a proposal to charge or discharge the vehicle by using the extracted charger.

10 Claims, 10 Drawing Sheets

(56)                     References Cited

U.S. PATENT DOCUMENTS

| | | | |
|---|---|---|---|
| 2017/0138758 A1* | 5/2017 | Ricci ....................... | B60L 58/21 |
| 2019/0137278 A1* | 5/2019 | Sakuma ................. | G01C 21/20 |
| 2021/0162880 A1* | 6/2021 | Sakuma ................. | B60L 53/60 |
| 2021/0396534 A1 | 12/2021 | Saito et al. | |
| 2022/0048400 A1 | 2/2022 | Sumi et al. | |
| 2022/0194259 A1* | 6/2022 | Ehara ..................... | B60L 53/68 |
| 2022/0305940 A1* | 9/2022 | Kobuna ............... | B60L 53/305 |
| 2023/0324191 A1* | 10/2023 | Basso ............... | G01C 21/3476 |
| | | | 701/426 |
| 2024/0361137 A1* | 10/2024 | Aviv ..................... | B60L 58/12 |

FOREIGN PATENT DOCUMENTS

| | | | |
|---|---|---|---|
| JP | 2020-154915 A | 9/2020 | |
| JP | 2021-196323 A | 12/2021 | |
| WO | 2013137071 A1 | 9/2013 | |

* cited by examiner

FIG. 3

<< VEHICLE INFORMATION >>

| VEHICLE ID | SOC | CURRENT LOCATION | STOPOVER 1 | STOPOVER 2 | . . . | DESTI-NATION | CHARGER ID | BOOKED TIME |
|---|---|---|---|---|---|---|---|---|
| V-1 | % | * | * | * | . . . | * | E-100 | :~:** |
| V-2 | % | * | * | * | . . . | * | E-200 | :~:** |
| V-3 | **% | *** | *** | *** | . . . | *** | NOT BOOKED | NOT BOOKED |
| ⋮ | ⋮ | ⋮ | ⋮ | ⋮ | | ⋮ | ⋮ | ⋮ |

FIG. 4

<< USER INFORMATION >>

| USER ID | VEHICLE ID | SEX | AGE | MEAL | RECREATION | SIGHT-SEEING | . . . |
|---|---|---|---|---|---|---|---|
| U-1 | V-1 | *** | *** | *** | *** | *** | . . . |
| U-2 | V-2 | *** | *** | *** | *** | *** | . . . |
| U-3 | V-3 | *** | *** | *** | *** | *** | . . . |
| ⋮ | ⋮ | ⋮ | ⋮ | ⋮ | ⋮ | ⋮ | |

<< POWER SUPPLY AND DEMAND INFORMATION >>

<< POWER SUPPLY CONFIGURATION INFORMATION >>

AMOUNT OF ELECTRIC POWER GENERATED [kWh]

RENEWABLE ENERGY

FOSSIL ENERGY

REGION 7B    REGION 7D    REGION 7F    REGION 7G

NUCLEAR ENERGY

<< WEATHER INFORMATION >>

AMOUNT OF SOLAR RADIATION [J/(m²•h)]

REGION 7B    REGION 7D    REGION 7F    REGION 7G

SERVER, AND METHOD OF ADJUSTING ELECTRIC POWER SUPPLY AND DEMAND DURING CHARGE OR DISCHARGE OF VEHICLE TRAVELS TOWARD A DESTINATION ROUTE

CROSS-REFERENCE TO RELATED APPLICATION

This application claims priority to Japanese Patent Application No. 2022-180396 filed on Nov. 10, 2022, incorporated herein by reference in its entirety.

BACKGROUND

1. Technical Field

The disclosure relates to a server, and a method of adjusting electric power supply and demand.

2. Description of Related Art

Generally, an electrical storage device mounted on a vehicle, such as a battery electric vehicle, has a relatively large capacity, so a certain amount of charging time is required. Therefore, there are needs to book a charger, and various charger booking systems have been suggested. For example, WO 2013/137071 describes a charger booking system capable of efficiently operating chargers.

SUMMARY

When a vehicle travels toward a destination, there can be many chargers in a scheduled travel route of the vehicle. In such a situation, WO 2013/137071 is silent about how chargers are used is appropriate particularly from the viewpoint of stable supply of electric power and/or environmental protection.

The disclosure is to appropriately use chargers from the viewpoint of stable supply of electric power and/or environmental protection.

(1) A first aspect of the disclosure provides a server used to adjust demand or supply of electric power. The server includes a storage storing data on a plurality of chargers each configured to charge or discharge electric power to or from a vehicle equipped with an electrical storage device, and a processor configured to send a user of the vehicle a message that makes a proposal to charge or discharge the vehicle by using at least one of the plurality of chargers when the vehicle travels toward a destination. The processor is configured to acquire, for each of the plurality of chargers, power supply and demand information on demand or supply of electric power in a power grid of a region in which the charger is installed, extract a charger installed in a region with larger demand or supply of electric power than another region from among the plurality of chargers based on predetermined information including the power supply and demand information, and send the message that makes a proposal to charge or discharge the vehicle by using the extracted charger.

(2) The processor may be configured to extract the charger installed in the region with larger demand or supply of electric power from among the plurality of chargers as a priority charger with a priority rank higher than a predetermined rank, and send the message that makes a proposal to charge or discharge the vehicle by using the priority charger.

With the configuration of the above (1) or (2), a charger installed in a region with larger demand or supply of electric power is extracted based on predetermined information including power supply and demand information, and a proposal is made to charger or discharge a vehicle by using the extracted charger. At this time, a charger with a priority rank higher than the predetermined rank may be extracted. When the vehicle participates in charging or discharging (demand response (described later)) the vehicle by using the extracted charger, it is possible to stabilize power supply demand balance in a power grid of the region in which the charger is installed and to reduce the generated electric power that causes a high environmental load. Thus, with the configuration of the above (1) or (2), chargers are appropriately used from the viewpoint of stable supply of electric power and environmental protection.

(3) The processor may be configured to further acquire travel information indicating a scheduled travel route to the destination of the vehicle. The processor may be configured to predict whether the vehicle is able to reach the destination by using electric power stored in the electrical storage device when the vehicle travels along the scheduled travel route based on the travel information. When the vehicle is able to reach the destination, the processor may be configured to extract the priority charger from among one or more chargers installed in the destination, and send the message that makes a proposal for at least one of charging from the priority charger to the vehicle and discharging from the vehicle to the priority charger. When the vehicle is not able to reach the destination, the processor may be configured to extract the priority charger from among one or more chargers installed in a stopover from which the vehicle is able to reach the destination, and send the message that makes a proposal to charge the vehicle from the priority charger.

With the configuration of the above (3), when the vehicle is able to reach the destination, the processor sends a message that makes a proposal to charge or discharge the vehicle by using the charger installed in the destination. This is because, after reaching the destination, it is possible to charge or discharge the vehicle without any consideration of electric power stored in the electrical storage device. On the other hand, when the vehicle is not able to reach the destination, the processor sends a message that makes a proposal to charge the vehicle by using the charger installed in a stopover. Thus, by avoiding a proposal to discharge the vehicle, it is possible to avoid a situation in which the vehicle is not able to reach the destination.

(4) The processor may be configured to further acquire, for each of the plurality of chargers, power supply configuration information of a region in which the charger is installed, extract a charger installed in a region with a higher component ratio of renewable energy than another region from among the plurality of chargers as the priority charger based on the power supply configuration information, and send the message that makes a proposal to charge the vehicle from the priority charger.

(5) The processor may be configured to exclude a charger installed in a region with a higher component ratio of fossil energy than another region from the priority charger based on the power supply configuration information.

With the configuration of the above (4), a charger installed in a region with a higher component ratio of renewable energy is extracted. Alternatively, with the configuration of the above (5), a charger installed in a region with a higher component ratio of fossil energy is excluded. Thus, an environmental load is reduced.

(6) The processor may be configured to further acquire, for each of the plurality of chargers, power supply configuration information of a region in which the charger is installed, and extract a charger installed in a region with a higher component ratio of a natural fluctuating power supply than another region from among the plurality of chargers based on the power supply configuration information as the priority charger.

(7) The processor may be configured to further acquire, for each of the plurality of chargers, weather information of a region in which the charger is installed, and extract a charger installed in a region with a greater amount of solar radiation or a higher wind velocity than another region from among the plurality of chargers as the priority charger.

(8) The processor may be configured to further acquire, for each of the plurality of chargers, weather information of a region in which the charger is installed, and extract a charger installed in a region with a greater fluctuation in an amount of solar radiation or a greater fluctuation in a wind velocity than another region from among the plurality of chargers as the priority charger.

With the configuration of the above (6), a charger installed in a region with a higher component ratio of a natural fluctuating power supply (such as a photovoltaic generator set and a wind generator set) is extracted. With the configuration of the above (7), a charger installed in a region with a greater amount of solar radiation or a higher wind velocity is extracted. With the configuration of the above (8), a charger installed in a region with a greater fluctuation in the amount of solar radiation or a greater fluctuation in wind velocity is extracted. In the region of the above (7), there is a possibility that a redundant amount of electric power generated by a photovoltaic generator set or a wind generator set easily occurs. In the regions of the above (6) and (8), there is a possibility that the amount of electric power generated easily fluctuates with a change in weather. Thus, by using the chargers in these regions, a redundancy or fluctuation in the amount of electric power generated in the regions is appropriately absorbed with the vehicle.

(9) The processor may be configured to further acquire, for each of the plurality of chargers, sightseeing information of a region in which the charger is installed, and extract a charger installed in a region closer to a recommended sightseeing area than another region from among the plurality of chargers as the priority charger.

With the configuration of the above (9), the user is able to enjoy sightseeing by using waiting time during charging or discharging of the vehicle.

(10) The processor may be configured to send the message such that the message is displayed on at least one of a display mounted on the vehicle and a user equipment owned by the user.

With the configuration of the above (10), the user is able to easily check the message.

(11) A second aspect of the disclosure provides a method of adjusting electric power supply and demand with a computer. The method includes acquiring, for each of a plurality of chargers, power supply and demand information on demand or supply of electric power in a power grid of a region in which the charger is installed, extracting at least one charger installed in a region with larger demand or supply of electric power than another region from among the plurality of chargers based on predetermined information including the power supply and demand information, and sending a user of a vehicle a message that makes a proposal to charge or discharge the vehicle using the extracted charger.

With the method of the above (11), as in the case of the configuration of the above (1), chargers are appropriately used from the viewpoint of stable supply of electric power and/or environmental protection.

According to the aspects of the disclosure, chargers are appropriately used from the viewpoint of stable supply of electric power and/or environmental protection.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a conceptual view that shows an example of vehicle information;

FIG. 4 is a conceptual view that shows an example of user information;

DETAILED DESCRIPTION OF EMBODIMENTS

Figure 1:
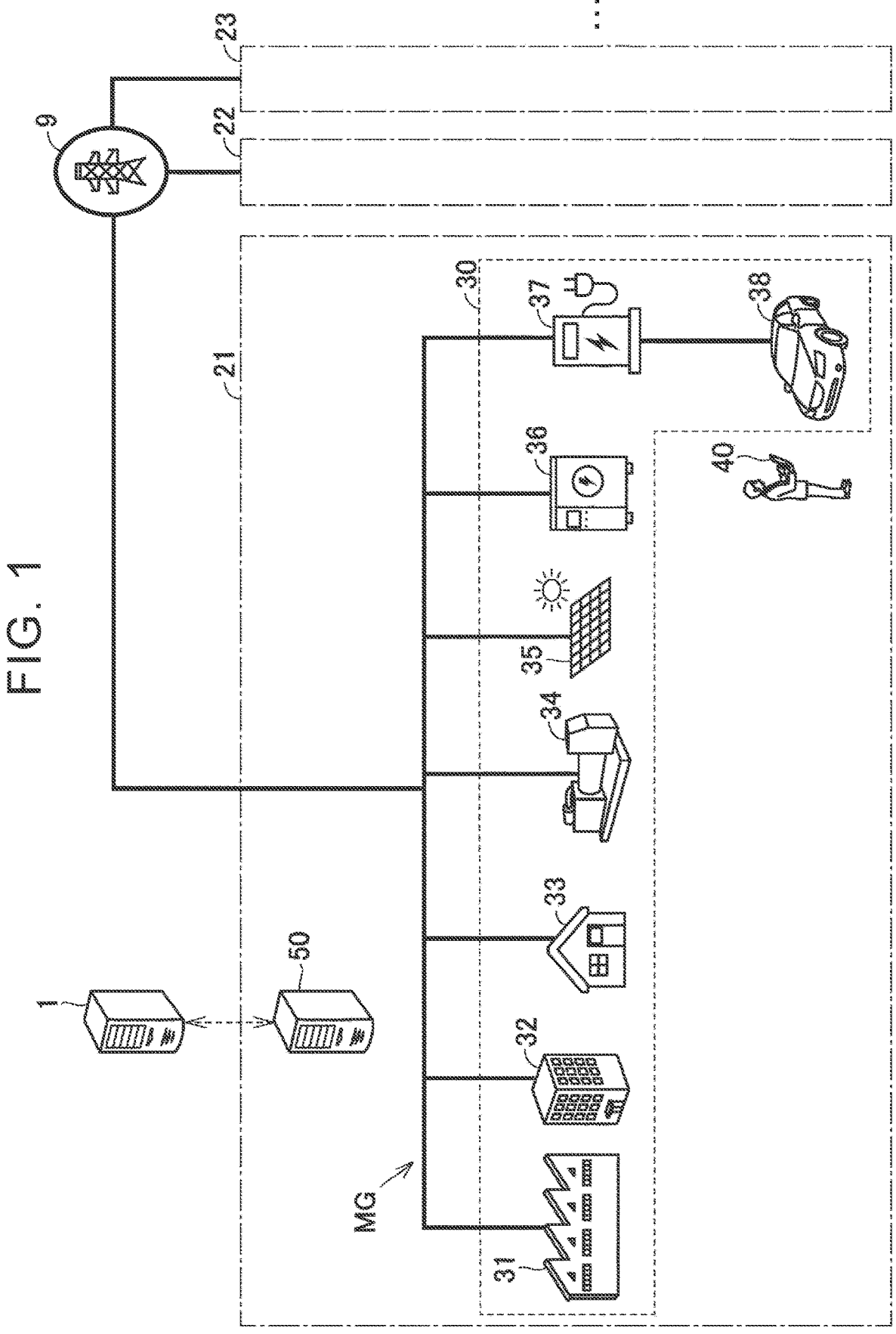
FIG. 1 is a diagram that shows a schematic configuration of an electrical power system according to an embodiment of the disclosure.

Hereinafter, an embodiment of the disclosure will be described in detail with reference to the accompanying drawings. Like reference signs denote the same or corresponding portions in the drawings, and the description thereof will not be repeated.

In the aspects of the disclosure and the embodiment, the term "supply and demand" of electric power means at least one of supply and demand of electric power. In other words, the term "supply and demand" of electric power may mean only demand of electric power, may mean only supply of electric power, or may mean both demand and supply of electric power.

In the aspects of the disclosure and the embodiment, the term "charging or discharging" of a vehicle means at least one of charging and discharging of a vehicle. In other words, only charging of a vehicle may be performed, only discharging of a vehicle may be performed, or both charging and discharging of a vehicle may be performed.

Embodiment

Overall System Configuration

FIG. 1 is a diagram that shows a schematic configuration of an electrical power system according to the embodiment of the disclosure. The electrical power system includes, for example, a server 1, a plurality of CEMSs 21, 22, 23, and an electrical grid 9.

The server 1 is a computer used to adjust supply and demand of electric power in the electrical grid 9. For example, the server 1 may belong to a power company, may belong to an aggregator, or may belong to another corporation (such as an automobile manufacturer). The server 1 may be configured to procure electric power from an electricity market. The configuration of the server 1 will be described with reference to FIG. 2. The server 1 may be regarded as the "server" according to the aspect of the disclosure. The "server" according to the aspect of the disclosure may have both the function of the server 1 and the function of a server 50 (described later) that belongs to an aggregator.

A CEMS means a community energy management system or a city energy management system. The configuration of each of the CEMSs 22, 23 is similar to the configuration of the CEMS 21, so, hereinafter, the configuration of the CEMS 21 will be representatively described. Because of space limitations, FIG. 1 shows three CEMSs; however, the electrical power system may include four or more CEMSs.

The CEMS 21 includes a plurality of distributed energy resources (DERs) 30, a user equipment (UE) 40, and the server 50. The DERs 30 include, for example, a factory energy management system (FEMS) 31, a building energy management system (BEMS) 32, a home energy management system (HEMS) 33, a generator 34, a natural fluctuating power supply 35, an electric power storage system (energy storage system (ESS)) 36, a charger (electric vehicle supply equipment (EVSE))37, and a vehicle 38. In the CEMS 21, a small-scale power generation network (microgrid) is constructed of these component elements.

The FEMS 31 is a system that manages supply and demand of electric power used in a factory. The FEMS 31 includes, for example, a factory building (including luminaires, air conditioning equipment, and the like) that operates on electric power supplied from the microgrid, industrial facilities (such as a production line), a generator set installed in a factory (such as a generator and a photovoltaic panel), and the like.

The BEMS 32 is a system that manages supply and demand of electric power used in a building, such as an office and a commercial facility. The BEMS 32 includes luminaires and air conditioning equipment installed in a building. The BEMS 32 may include a generator set (such as a photovoltaic panel) or may include a low temperature heat source system (such as a waste heat recovery system and a heat storage system).

The HEMS 33 is a system that manages supply and demand of electric power used at home. The HEMS 33 includes a domestic appliance (such as a luminaire, an air conditioner, and other electric products) that operates on electric power supplied from the microgrid. The HEMS 33 may include a photovoltaic panel, a domestic heat pump system, a domestic cogeneration system, a domestic storage battery, or the like.

The generator 34 is a generator set of which the generating power is independent of weather conditions. The generator 34 can include a steam turbine generator, a gas turbine generator, a diesel engine generator, a gas engine generator, a biomass generator, a stationary fuel cell, and the like. The generator 34 may include a cogeneration system that uses heat generated during power generation.

The natural fluctuating power supply 35 is a generator set of which the generating power fluctuates depending on weather conditions. FIG. 1 illustrates a photovoltaic generator set (photovoltaic panel). The natural fluctuating power supply 35 may include a wind generator set, a geothermal generator set, or the like, instead of or in addition to a photovoltaic generator set.

The electric power storage system 36 is a stationary power supply that stores electric power generated by the natural fluctuating power supply 35 or the like. The electric power storage system 36 includes a secondary battery, such as a lithium ion battery and a nickel-metal hydride battery, or a capacitor, such as an electrical double-layer capacitor. The electric power storage system 36 is not limited to a secondary battery. The electric power storage system 36 may include a power-to-gas apparatus that produces gaseous fuel (such as hydrogen and methane) by using dump electric power.

The EVSE 37 is electrically connected to the microgrid and configured to be capable of charging the vehicle 38 from the microgrid. The EVSE 37 is desirably configured to be capable of discharging the vehicle 38 (supplying electric power from the vehicle 38 to the microgrid) in addition to charging.

The vehicle 38 is specifically a battery electric vehicle (BEV), a plug-in hybrid electric vehicle (PHEV), a fuel cell electric vehicle (FCEV), or the like. The vehicle 38 is configured to be capable of charging (external charging) from the microgrid to the vehicle 38 when a charging cable is connected to an inlet (not shown) of the vehicle 38. The vehicle 38 is desirably configured to be capable of supplying (external power supply) electric power from the vehicle 38 to the microgrid when the charging cable is connected to an outlet (not shown) of the vehicle 38.

The user equipment 40 is an apparatus to be operated by a user of the vehicle 38. The user equipment 40 is typically a mobile terminal. Examples of the mobile terminal include a smartphone, a tablet, a notebook personal computer (PC), and a wearable device (such as a smart watch).

The server 50 is a computer that belongs to an aggregator. An aggregator is an electric power supplier that binds a plurality of DERs 30 and provides an energy management service. The server 50 makes a demand response (DR) plan for integrated control using the DERs 30 as a virtual power plant (VPP). A request to adjust electric power of the electrical grid 9 is issued to the DERs 30 in accordance with the DR plan made. The server 50 may cause the DERs 30 to adjust the electric power of an electrical grid, for which a request is issued from a higher-level server (not shown), by using DR or may cause the DERs 30 to adjust the electric power of the electrical grid 9, bid in the electricity market.

The server 50 is configured to bidirectionally communicate with the server 1. The server 50 provides the server 1 with power supply and demand information (described later) of the CEMS 21. The server 50 may provide the server 1 with the status of use (status of vacancy, status of booking, or the like) of the EVSE 37.

In the example shown in FIG. 1, each of the DERs 30 includes one component element. However, the number of the systems or the number of the facilities is selectable. The DERs 30 may include a plurality of the systems or a plurality of the facilities. There may be a system or a facility not included in the DERs 30. The DERs 30 typically include a plurality of the chargers 37 and a plurality of the vehicles 38.

The electrical grid 9 is a large-scale power grid constructed of a power plant and a power collection system. In the embodiment, a power company serves as both a power generation operator and a power transmission and distribution operator. A power company corresponds to a general power transmission and distribution operator and also corresponds to a manager of the electrical grid 9, and maintains and manages the electrical grid 9.

Server Configuration

Figure 2:
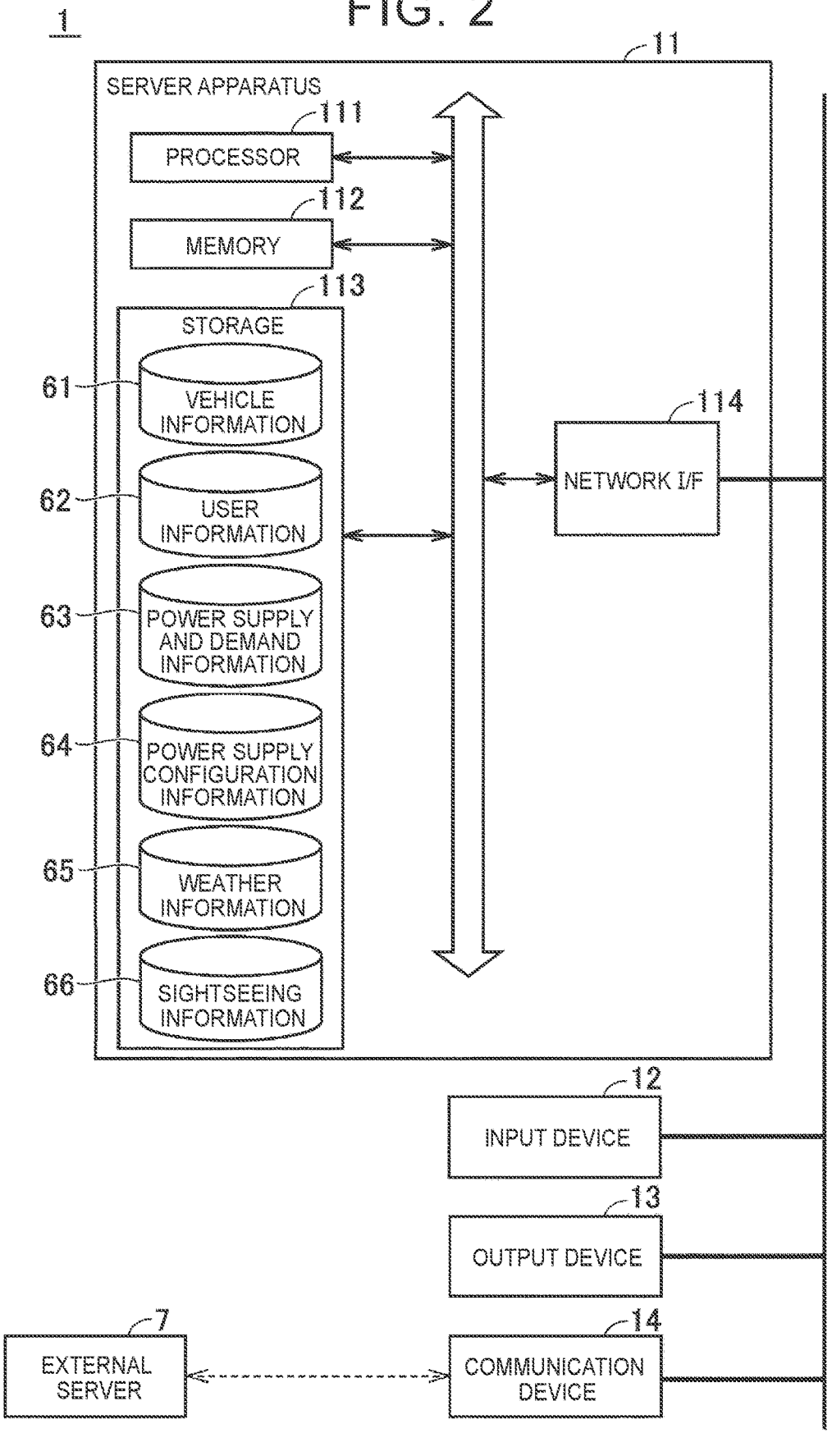
FIG. 2 is a block diagram that shows a typical configuration example of a server.

FIG. 2 is a block diagram that shows a typical configuration example of the server 1. The server 1 includes a server apparatus 11, an input device 12, an output device 13, and a communication device 14. The server apparatus 11 includes a processor 111, a memory 112, a storage 113, and a network interface 114. The component elements of the server 1 are connected to one another via a communication bus.

The processor 111 is an arithmetic processing unit, such as a central processing unit (CPU) and a micro-processing unit (MPU). The memory 112 is a volatile memory, such as a random access memory (RAM). The storage 113 is a rewritable nonvolatile memory, such as a hard disk drive (HDD), a solid state drive (SSD), and a flash memory. A system program including an operating system (OS) and a control program including computer-readable code needed for arithmetic processing are stored in the storage 113. The processor 111 implements various processes by reading the system program and the control program, expanding the system program and the control program on the memory 112, and running the system program and the control program.

The storage 113 includes a plurality of databases 61, 62, 63, 64, 65, 66. Vehicle information, user information, power supply and demand information, power supply configuration information, weather information, and sightseeing information are respectively stored in the databases 61, 62, 63, 64, 65, 66.

FIG. 3 is a conceptual view that shows an example of the vehicle information. The vehicle information is information mainly related to a travel plan of each vehicle 38. The vehicle information includes, for example, a vehicle ID, information on the state of charge (SOC) and/or amount of electricity of a battery (electrical storage device) mounted on the vehicle 38, information on the scheduled travel route (a current location, a stopover, and a destination, estimated arrival time at each point, and the like) of the vehicle 38, and information on a charge booking of the vehicle 38 (charger ID, booked time, and the like). Although not shown in the drawing, the vehicle information may further include information on the specifications (vehicle type, vehicle body size, charge performance, and the like) of the vehicle 38.

Each of the vehicles 38 sequentially sends vehicle information on the host vehicle to the server 1. For example, each vehicle 38 sends the server 1 in real time vehicle information (for example, the location of the vehicle 38 and the SOC of the battery) while traveling. Each vehicle 38 may send the server 1 the latest vehicle information (for example, location information and SOC information) also at the timing a vehicle control system switches between an on state and an off state (ignition on and ignition off). Each vehicle 38 may send the server 1 vehicle information (for example, a charger ID and booked time) when, for example, a new charge booking is set in response to operation of the user. The server 1 updates vehicle information stored in the database 61 based on the vehicle information received from the vehicles 38.

FIG. 4 is a conceptual view that shows an example of the user information. The user information is information mainly related to the attribute and/or preference of each of the users. The user information includes, for example, a user ID, a vehicle ID for associating a user with a vehicle, attribute information (sex, age, address, family make-up, physical constitution, religion, and the like) of the user, and preference information (meal, recreation, sightseeing spot, and the like) of the user. The user information may include an activity history (information indicating places the user has visited in the past) of the user.

The user information is, for example, entered in advance in response to operation of the user on the user equipment 40. The details entered are sent from the user equipment 40 to the server 1 and stored in the database 62. However, how to acquire user information is not limited to the one based on operation of the user. For example, the preference of the user may be estimated from the attribute information and activity history of the user by using a trained model prepared in advance through machine learning, and the estimated result may be stored in the database 62 as the preference information of the user.

Referring back to FIG. 2, the power supply and demand information, the power supply configuration information, the weather information, and the sightseeing information are acquired as needed from, for example, an external server 7 and an associated database in the storage 113. These pieces of information will be described later. Although not shown in the drawings, map information including location information of chargers is further stored in the storage 113.

The network interface 114 controls data communication via the communication device 14 between the server apparatus 11 and another apparatus (the vehicle 38, the user equipment 40, the external server 7, or the like). The input device 12 is a keyboard, a mouse, or the like and receives information input by an operator of the server apparatus 11. The output device 13 is, for example, a display and outputs various pieces of information for the operator of the server apparatus 11.

FIG. 2 shows an example in which the server apparatus 11 includes the single processor 111. The server apparatus 11 may include a plurality of processors. In other words, the server apparatus 11 includes one or more processors. The same applies to the memory 112 and the storage 113. In the specification, the term "processor" is not limited to a narrow-sense processor that executes a process in a stored program manner and can include a hard wired circuit, such as an application specific integrated circuit (ASIC) and a field-programmable gate array (FPGA). For this reason, the term "processor" may be read as processing circuitry in which a process is defined in advance by a computer-readable code and/or a hard wired circuit.

Booking Proposal Process

When the vehicle 38 travels toward a destination, there can be a plurality of the EVSEs 37 in a scheduled travel route of the vehicle 38. In the present embodiment, particularly, from the viewpoint of stable supply of electric power in the electrical grid 9 and/or environmental protection, the EVSEs 37 that are desirable to be used are extracted, and a booking of the EVSEs 37 extracted is proposed to the user of the vehicle 38. Hereinafter, this process is referred to as "booking proposal process".

Figure 5:
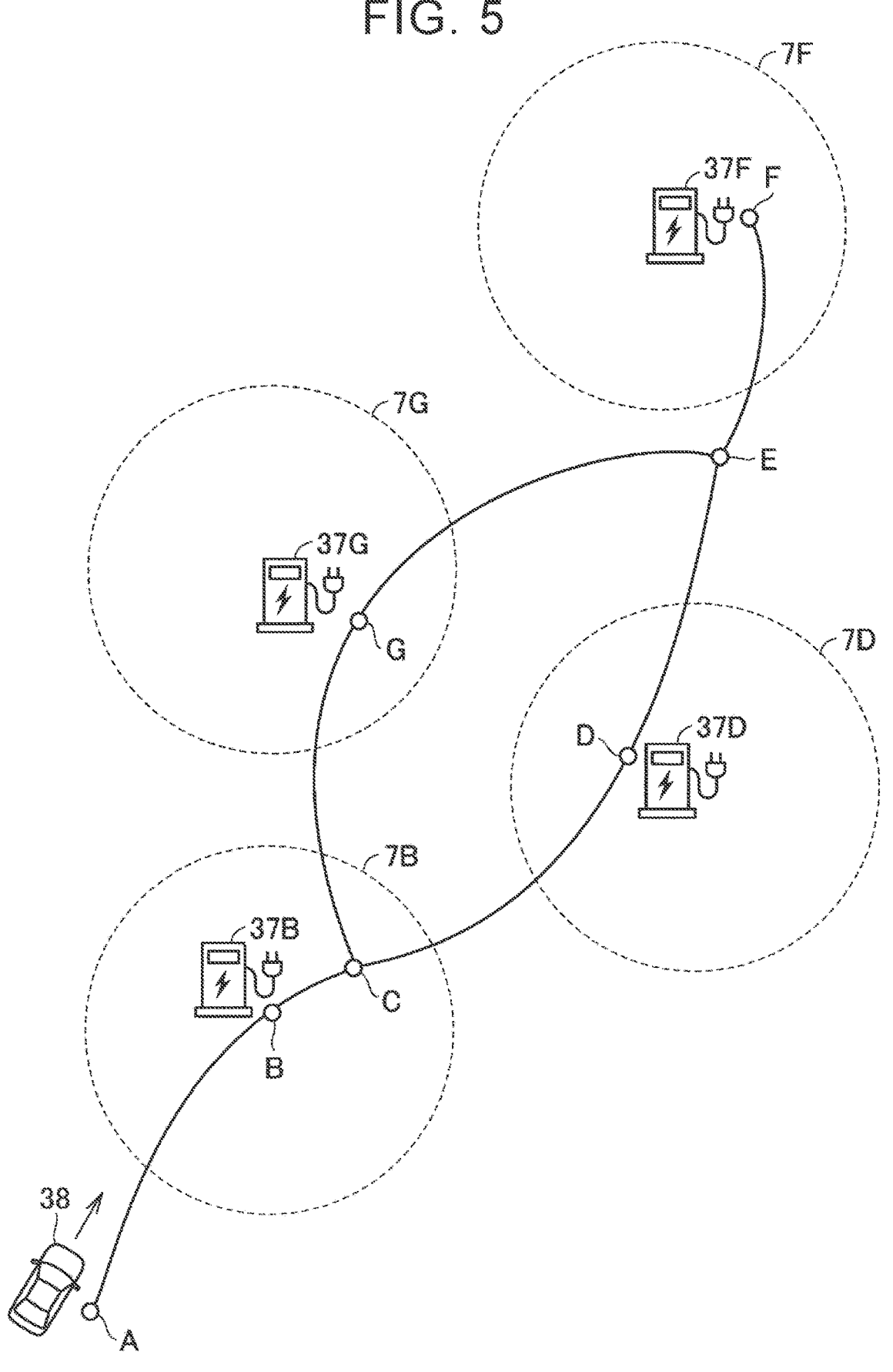
FIG. 5 is a diagram for illustrating an example of an assumed situation of a booking proposal process.

FIG. 5 is a diagram for illustrating an example of an assumed situation of the booking proposal process. In this example, there are two routes. The first route is a route from a current location A via stopovers B, C, D, E to a destination F. The first route is, for example, the shortest route (or the fastest route) and is a scheduled travel route of the vehicle 38. The second route is a route from the current location A via stopovers B, C, G, then merges the stopover E, and reaches the destination F. A charger 37B is installed at the stopover B. A charger 37D is installed at the stopover D. A charger 37G is installed at the stopover G. A charger 37F is installed at the destination F.

The whole region shown in FIG. 5 is divided into a plurality of regions according to microgrids. For example, the charger 37B installed at the stopover B is electrically connected to the microgrid of a region 7B. In other words, the charger 37B is a component element of a CEMS (for example, the CEMS 21 shown in FIG. 1) provided in the region 7B. The same applies to the other chargers 37D, 37F, 37G. In this way, the four chargers 37B, 37D, 37F, 37G are respectively included in the CEMSs different from one another.

Power Supply and Demand Information

Figure 6:
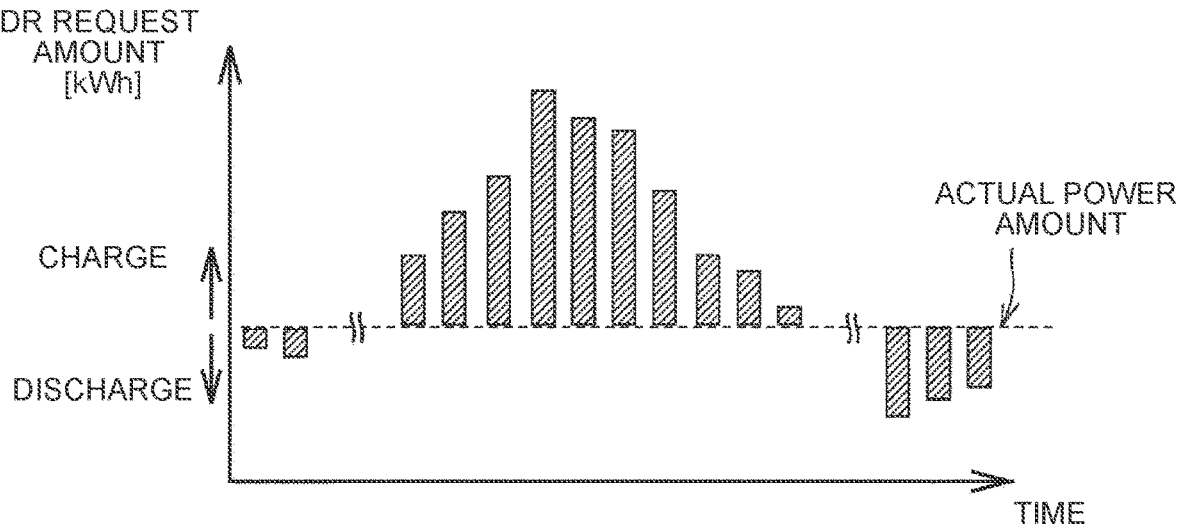
FIG. 6 is a graph for illustrating an example of a technique to use power supply and demand information.

FIG. 6 is a graph for illustrating an example of a technique to use power supply and demand information. The abscissa axis represents time. The ordinate axis represents DR request amount (power adjustment amount requested by DR). In the DR plan according to the embodiment, for example, a DR request amount of each of 48 time periods (=each 30 minutes) into which an intended day is divided is determined for each region. In this example, a DR request amount is shown according to a relative relationship with an actual power amount. An actual power amount is a power demand amount according to movement of power supply and demand of a region without issuing a DR request. For each of the regions 7B, 7D, 7F, 7G, a power supply and demand prediction (a DR request amount in the region) as shown in FIG. 6 is prepared based on a power supply and demand result of the electrical grid 9, and stored in the database 63 (see FIG. 2) as power supply and demand information.

When, for example, a power demand amount in the region 7B is insufficient for an actual power amount, the DR request amount is negative, and a request to discharge from the microgrid is issued. In this case, it is desirable to charge the vehicle 38 from the microgrid in the region 7B. In contrast, when the power demand amount in the region 7B exceeds an actual power amount, the DR request amount is positive, and a request to charge the microgrid is issued. In this case, it is desirable to discharge electric power from the vehicle 38 to the microgrid in the region 7B.

The server 1 extracts appropriate chargers from among chargers within a range the vehicle 38 can reach based on a power supply and demand prediction at estimated arrival time at each of the chargers. Hereinafter, some representative examples of a technique to extract chargers will be described.

Figure 7:
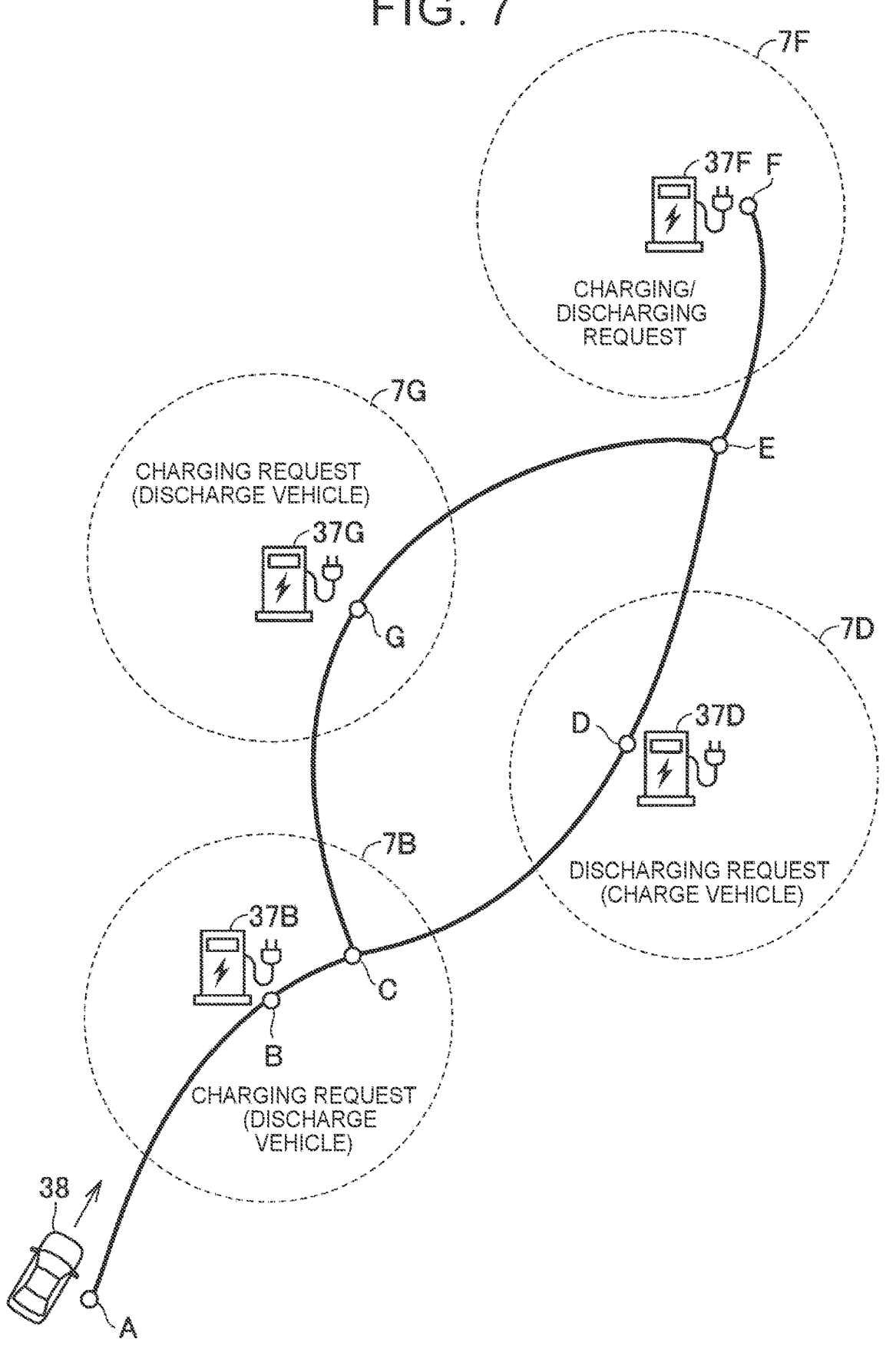
FIG. 7 is a diagram that shows a first example of a technique to extract chargers.

FIG. 7 is a diagram that shows a first example of a technique to extract chargers. In this example, the vehicle 38 can reach a destination without charging on the way even when the vehicle 38 travels along any of the first route and the second route. In this case, the server 1 extracts chargers from among the charger 37F installed at the destination F and the three chargers 37B, 37D, 37G respectively installed at the stopovers B, D, G.

More specifically, the server 1 proposes a user to participate in DR in the region 7F by using the charger 37F installed at the destination F. In the region 7F that is the destination, based on power supply and demand information at estimated arrival time at the destination, a request to charge the microgrid (to discharge the vehicle 38) may be issued or a request to discharge the microgrid (to charge the vehicle 38) may be issued.

On the other hand, for the regions 7B, 7D, 7G that are stopovers, it is assumed that, based on power supply and demand information, a request to charge the microgrid (to discharge the vehicle 38) is issued in the regions 7B, 7G and a request to discharge the microgrid (to charge the vehicle 38) is issued in the region 7D. In this case, the server 1 desirably proposes the user to participate in DR of a discharging request (a request to charge the vehicle 38) in the region 7D by using the charger 37D installed in the region 7D. This is because, when the vehicle 38 participates in DR of a charging request (a request to discharge the vehicle 38) in the regions 7B, 7G, the SOC of the battery excessively decreases and, as a result, the vehicle 38 possibly cannot reach the destination.

In this way, in the example shown in FIG. 7, the priority rank of each of the charger 37F of the destination F and the charger 37D of the stopover D is set to a higher priority. As a result, the charger 37F and the charger 37D are proposed to the user. Chargers to be proposed may be displayed on the screen (navigation screen) 381 (see FIG. 8) of a navigation system mounted on the vehicle 38 or may be displayed on the user equipment 40.

Figure 8:
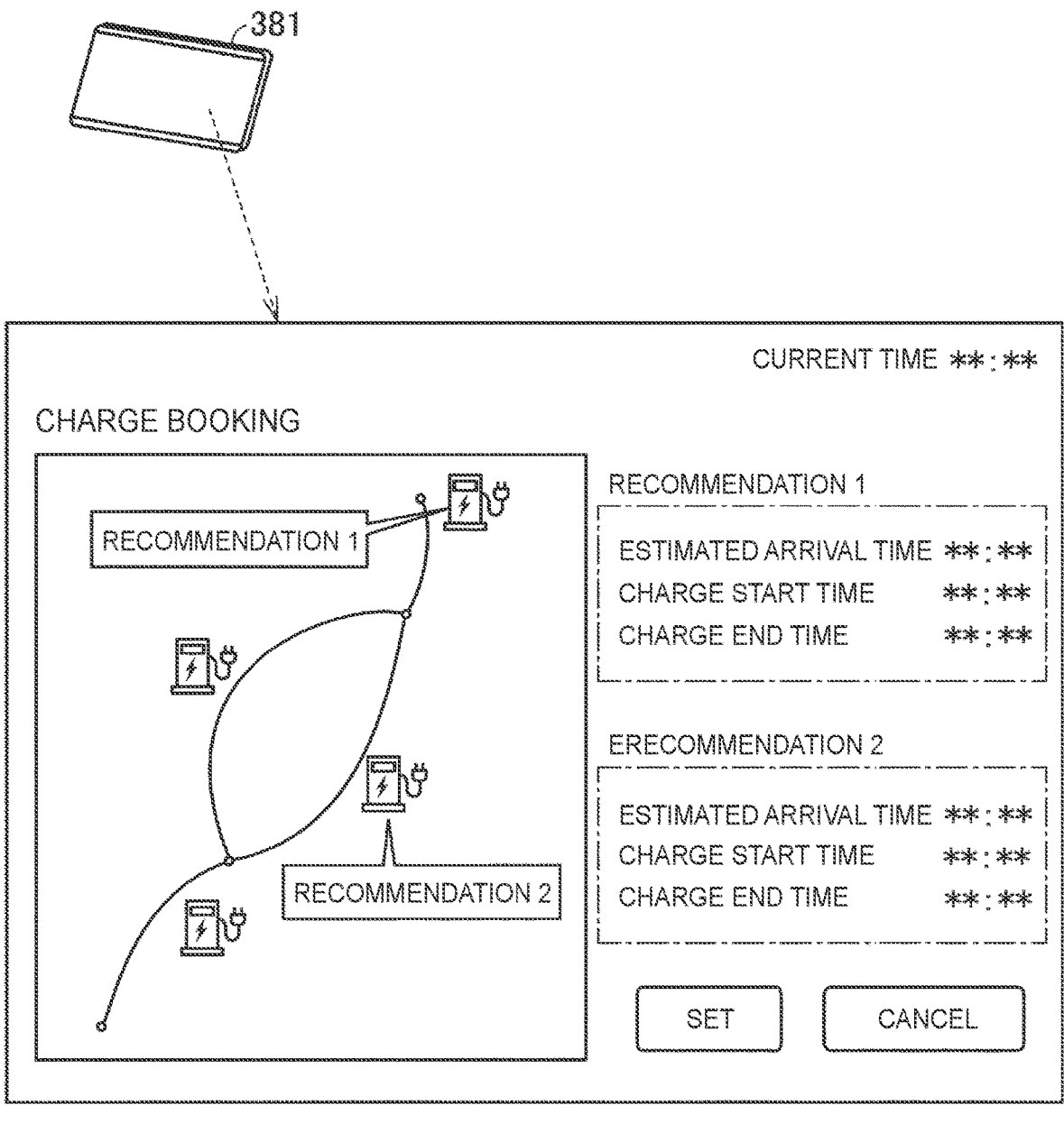
FIG. 8 is a view that shows an example of display proposing chargers to a user.

FIG. 8 is a view that shows an example of display proposing chargers to the user. In the example shown in FIG. 8, the priority rank of the charger 37F is the highest, and the charger 37F is displayed with "Recommendation 1". The priority rank of the charger 37D is the second highest, and the charger 37D is displayed with "Recommendation 2". When any one of the chargers is selected, the navigation screen 381 desirably displays estimated arrival time at the charger selected and a usage period (start time and end time) of the charger. When the user selects any one of the chargers and then depresses a set button, the user is able to make a charge booking with the charger selected.

Figure 9:
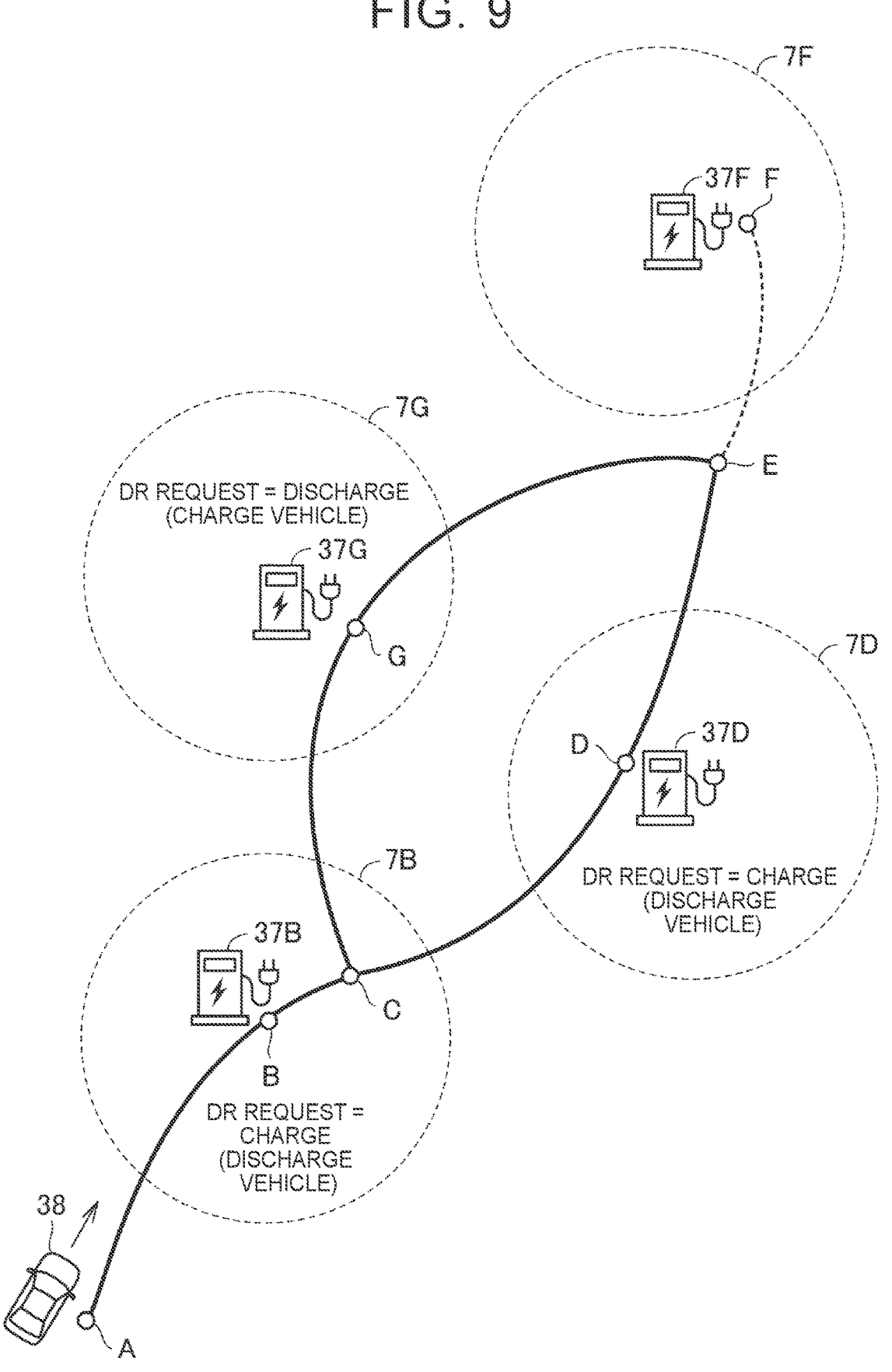
FIG. 9 is a diagram that shows a second example of a technique to extract chargers.

FIG. 9 is a diagram that shows a second example of a technique to extract chargers. In this example, the vehicle 38 just can travel up to around the stopover E without charging on the way and cannot reach the destination F even when the vehicle 38 travels along any of the first route and the second route. In this case, the server 1 extracts chargers from among the three chargers 37B, 37D, 37G respectively installed at the stopovers B, D, G.

It is assumed that, based on power supply and demand information at estimated arrival time at each point, a request to charge the microgrid (to discharge the vehicle 38) is issued in the regions 7B, 7D, and a request to discharge the microgrid (to charge the vehicle 38) is issued in the region 7G. In this case, the server 1 proposes the user to participate in DR of a discharging request (a request to charge the vehicle 38) in the region 7G by using the charger 37G installed in the region 7G.

In the example shown in FIG. 9, the priority rank of the charger 37G is set to a higher priority, and the user is proposed to use the charger 37G. When the charger 37G is used, a travel distance extends as compared to when the charger 37D in the first route is used. In other words, to use the charger 37G, the vehicle 38 is required to travel along the second route that is not the shortest route (or the fastest route). However, in the present embodiment, a proposal to participate in DR is given a higher priority than to reduce the travel distance and/or travel time of the vehicle 38. How to display chargers proposed is similar to that described with reference to FIG. 8, so the description thereof will not be repeated.

Information used to determine the priority ranks of chargers is not limited to power supply and demand information. The server 1 may determine the priority ranks by using power supply configuration information, weather information, sightseeing information, and the like, in addition to the power supply and demand information.

Power Supply Configuration Information

Figures 10, 11:
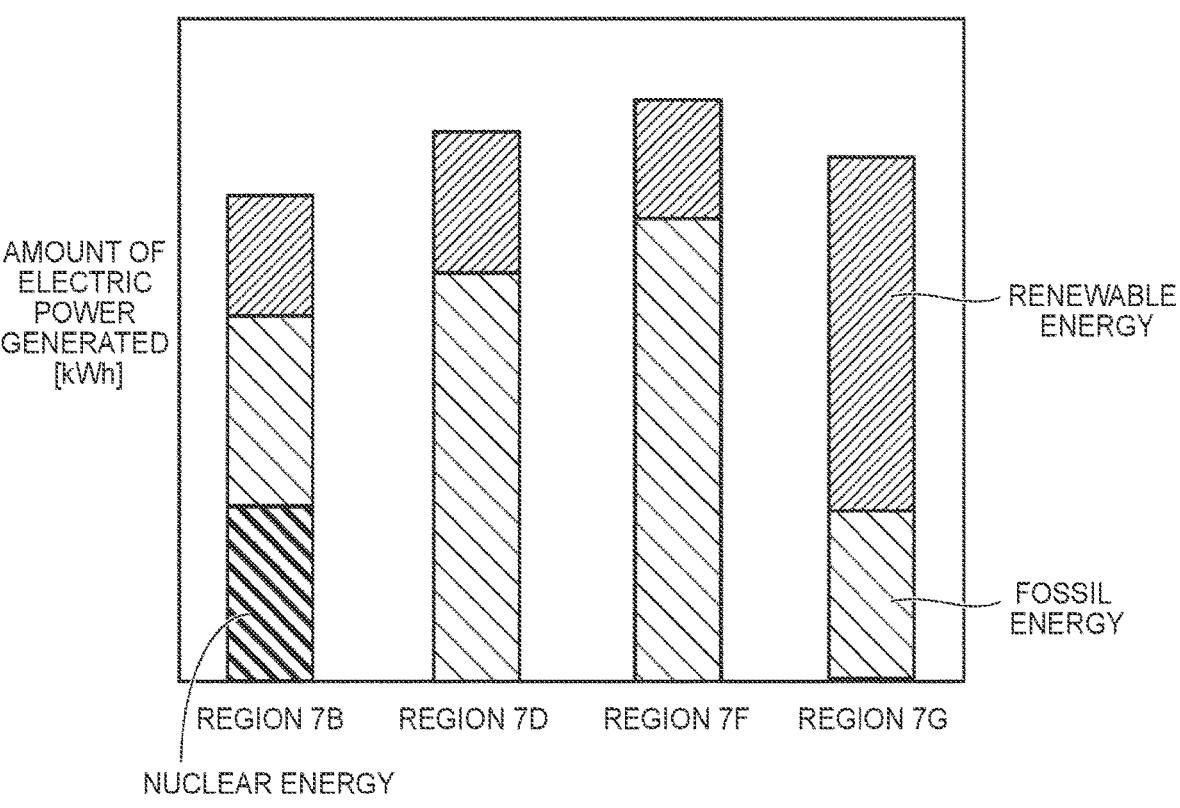
FIG. 10 is a graph for illustrating an example of a technique to use power supply configuration information.
FIG. 11 is a graph for illustrating an example of a technique to use weather information.

FIG. 10 is a graph for illustrating an example of a technique to use power supply configuration information.

Power supply configuration information is, for example, information indicating the amount of electric power generated from nuclear energy, the amount of electric power generated from fossil energy (such as coal, natural gas, and petroleum), and the amount of electric power generated from renewable energy (such as sunlight, wind power, geothermal heat, and biomass) for each region.

In the example shown in FIG. 10, the ratio of renewable energy in the region 7G is the highest. When there occurs DR of a discharging request (a request to charge the vehicle 38) in a plurality of regions including the region 7G, the server 1 may maximize the priority rank of the region 7G. This is because, as the ratio of renewable energy increases, the amount of emissions of greenhouse effect gas and air pollutants (such as nitrogen oxides, sulfur dioxide, and the like) resulting from power generation is reduced and environmental load is reduced.

Alternatively, the ratio of fossil energy in the region 7F is the highest. When there occurs DR of a discharging request (a request to charge the vehicle 38) in a plurality of regions including the region 7F, the server 1 may minimize the priority rank of the region 7F. The server 1 may exclude chargers installed in regions with a high component ratio of fossil energy (for example, the region 7F) from objects to assign the priority rank.

Weather Information

FIG. 11 is a graph for illustrating an example of a technique to use weather information. Weather information is, for example, information related to the amount of solar radiation in each region. More specifically, the amount of solar radiation in each predetermined period (for example, each hour) in each region may be used.

In the example shown in FIG. 11, in the region 7D, the amount of solar radiation (particularly, a maximum value) in a predetermined period is large. In a region in which the amount of solar radiation is large, a redundancy of the amount of electric power generated by a photovoltaic generator set more easily occurs as compared to a region in which the amount of solar radiation is small. Therefore, when there occurs DR of a charging request or a discharging request in a plurality of regions including the region 7D, the server 1 may raise the priority rank of DR in the region 7D. Thus, a redundant amount of electric power generated by a photovoltaic generator set in the region 7D is suitably absorbed by using the vehicle 38.

In the region 7D, variations (for example, dispersion) in the amount of solar radiation in a predetermined period are the largest. The fact that variations in the amount of solar radiation are large means that the amount of solar radiation easily fluctuates (weather easily changes), and the amount of electric power generated by a photovoltaic generator set easily fluctuates. Therefore, when there occurs DR of a charging request or a discharging request in a plurality of regions including the region 7D, the server 1 may raise the priority rank of DR in the region 7D. Thus, fluctuations in the amount of electric power generated by a photovoltaic generator set in the region 7D are suitably absorbed by using the vehicle 38.

FIG. 11 shows an example in which weather information is information related to the amount of solar radiation. Alternatively, information related to the amount of electric power generated by the photovoltaic generator set for each predetermined period in each region may be used. Instead of or in addition to the amount of solar radiation, an air volume (the amount of electric power generated by a wind generator set) may be used.

Sightseeing Information

Although not shown in the drawing, sightseeing information includes information related to famous sightseeing spots, good unknown sightseeing spots, and the like. Sightseeing information may include information related to restaurants, recreation spots, and the like. The server 1 determines whether there is a sightseeing spot or the like that meets the preference of a user near a charger based on user information (see FIG. 4). The server 1 raises the priority rank of a region in which there is a sightseeing spot or the like that meets the preference of the user near a charger. The server 1 may change the priority rank according to a time period. For example, the server 1 raises the priority rank of restaurants in a time period for lunch. The server 1 may raise the priority rank as the degree of crowdedness decreases in consideration of the degree of crowdedness of a charging spot. The user is able to enjoy sightseeing or the like using a waiting time during charging or discharging of the vehicle 38 by using sightseeing information to set the priority rank and providing the user with information about a sightseeing spot or the like near a charger.

When two or more types of pieces of information other than power supply and demand information (power supply configuration information, weather information, and sightseeing information), based on which information on which importance is placed to determine the priority rank is determined as needed.

Flow of Process

Figure 12:
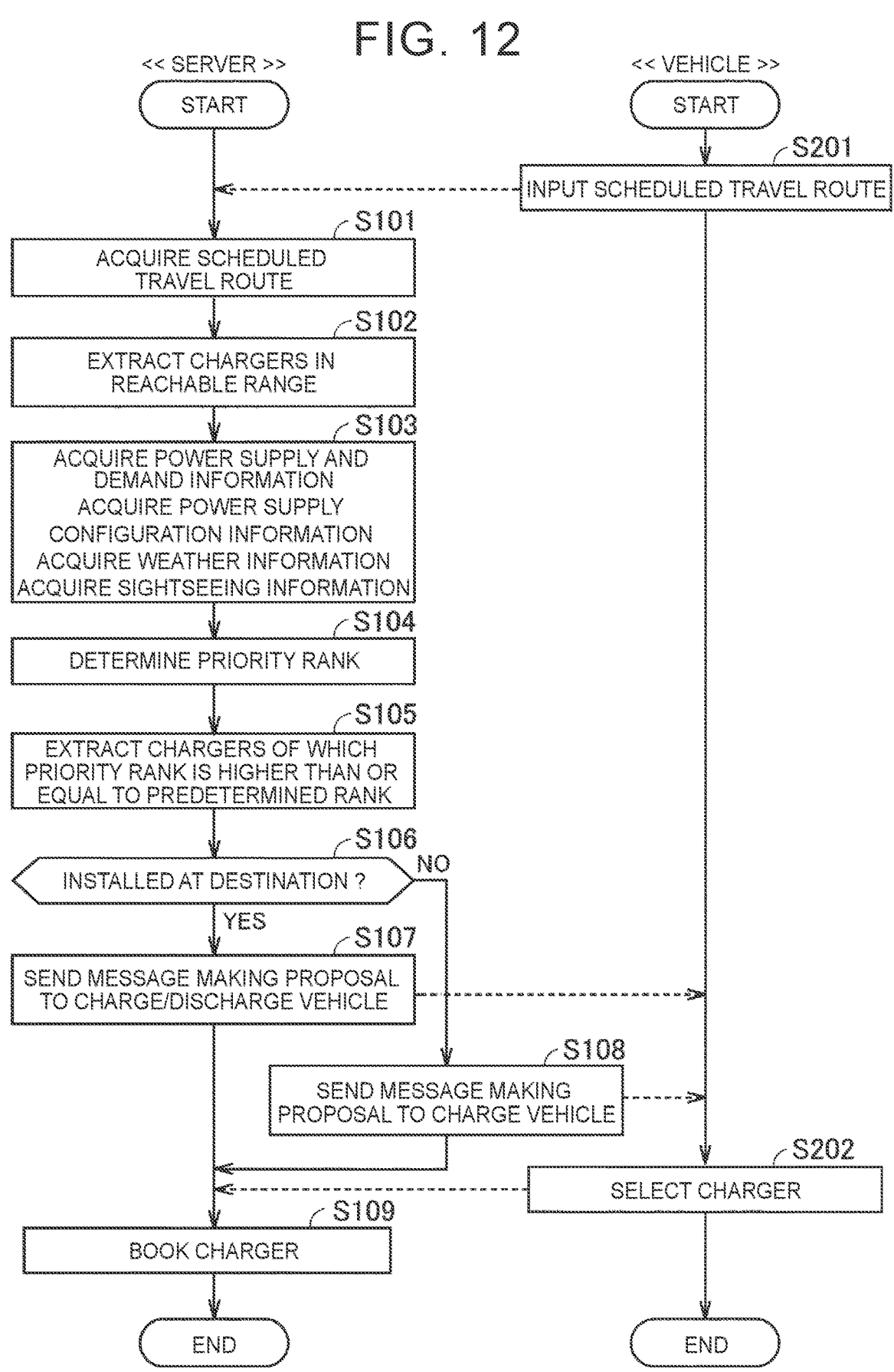
FIG. 12 is a flowchart that shows a procedure of the booking proposal process according to the present embodiment.

FIG. 12 is a flowchart that shows a procedure of the booking proposal process according to the present embodiment. In the flowchart, a process to be executed by the server 1 is shown on the left side, and a process to be executed by the vehicle 38 is shown on the right side. The right-side process may be executed by the user equipment 40. The flowchart is executed when, for example, a predetermined condition is satisfied (for example, at intervals of a control period). Steps are implemented by software processing of the processor 111 of the server 1 or an electronic control unit (CPU) of the vehicle 38. Alternatively, steps may be implemented by hardware (electrical circuit) disposed in the processor 111 or the ECU. Hereinafter, "step" is abbreviated as "S".

In S201, the vehicle 38 receives input operation to input a scheduled travel route of the vehicle 38 by a user. The input operation is typically performed on the navigation screen 381 (see FIG. 8). The vehicle 38 sends the scheduled travel route received to the server 1. The server 1 acquires the scheduled travel route of the vehicle 38 (S101). As described above, the server 1 sequentially receives vehicle information (location information, SOC information, and the like) of the vehicle 38.

In S102, the server 1 extracts chargers installed in a range in which the vehicle 38 can reach based on the scheduled travel route of the vehicle 38, the SOC of the battery, map information, and the like.

In S103, the server 1 acquires various pieces of information stored in the storage 113. More specifically, the server 1 reads power supply and demand information from the database 63. The server 1 reads power supply configuration information from the database 64. The server 1 reads weather information from the database 65. The server 1 reads sightseeing information from the database 66.

In S104, the server 1 determines the priority rank of each charger in the range in which the vehicle 38 can reach based on the pieces of information read in S103. How to determine the priority rank has been described in detail with reference to FIG. 6 to FIG. 11, so the description will not be repeated here.

In S105, the server 1 extracts chargers of which the priority rank is higher than or equal to a predetermined rank (for example, third place). Only the charger with the highest priority rank may be extracted.

In S106, the server 1 determines whether the chargers extracted are the ones installed at the destination. When the chargers are the ones installed at the destination (YES in S106), the server 1 sends the vehicle 38 a message proposing the user to participate in DR of a charging request (a request to discharge the vehicle 38) or a discharging request (a request to charge the vehicle 38) in the region (S107). On the other hand, when the chargers are not the ones installed at the destination (NO in S106), in other words, when the chargers are the ones installed at the stopovers, the server 1 sends the vehicle 38 a message proposing the user to participate in DR of a discharging request (a request to charge the vehicle 38) in the region (S108). In this way, the server 1 generates a message according to input operation to input the scheduled travel route by the user in S201 and sends the message to the vehicle 38.

In S202, the vehicle 38 selects a charger in accordance with operation of the user. The vehicle 38 provides notification about the charger selected to the server 1. Then, the server 1 books the charger about which notification is provided from the vehicle 38 (S109).

As described above, in the present embodiment, based on predetermined information including power supply and demand information, chargers installed in a region with high power supply and demand are extracted from among a plurality of chargers installed in a range in which the vehicle 38 can reach. Then, participation in DR of a charging request or discharging request using the charger extracted (a request to charge or a request to discharge the vehicle 38) is proposed. Resulting from participation in DR, it is possible to stabilize power supply demand balance in the electrical grid 9 and/or the microgrid and reduce generated electric power with a large environmental load, such as petroleum and coal. Thus, according to the present embodiment, the charger 37 is appropriately used from the viewpoint of stable supply of electric power and environmental protection.

The embodiment described above is illustrative and not restrictive in all respects. The scope of the disclosure is not defined by the description of the above-described embodiment, and is defined by the appended claims. The scope of the disclosure is intended to encompass all modifications within the scope of the appended claims and equivalents thereof.

What is claimed is:

1. A server used to adjust demand or supply of electric power, the server comprising:
   a storage storing data on a plurality of chargers each configured to charge or discharge electric power to or from a vehicle equipped with an electrical storage device; and
   a processor configured to send a user of the vehicle a message that makes a proposal to charge or discharge the vehicle by using at least one of the plurality of chargers when the vehicle travels toward a destination, wherein:
   the processor is configured to
      acquire, for each of the plurality of chargers, power supply and demand information relating to demand or supply of electric power in a power grid of a region in which the charger is installed,
      determine a priority of each of the plurality of chargers based on predetermined information including the power supply and demand information relating to demand or supply of electric power in the power grid of the region in which the charger is installed,
   extract, from among the plurality of chargers, a priority charger whose priority rank is higher than or equal to a predetermined rank, and
   send the message that makes a proposal to charge or discharge the vehicle by using the extracted priority charger.

2. The server according to claim 1, wherein:
the processor is configured to
   further acquire travel information indicating a scheduled travel route to the destination of the vehicle,
   predict whether the vehicle is able to reach the destination by using electric power stored in the electrical storage device when the vehicle travels along the scheduled travel route based on the travel information,
   when the vehicle is able to reach the destination, extract the priority charger from among one or more chargers installed in the destination, and send the message that makes a proposal for at least one of charging from the priority charger to the vehicle or discharging from the vehicle to the priority charger, and
   when the vehicle is not able to reach the destination, extract the priority charger from among one or more chargers installed in a stopover from which the vehicle is able to reach the destination, and send the message that makes a proposal to charge the vehicle from the priority charger.

3. The server according to claim 1, wherein:
the processor is configured to
   further acquire, for each of the plurality of chargers, power supply configuration information of a region in which the charger is installed,
   extract, from among the plurality of chargers a charger installed in a region with a highest renewable energy as the priority charger based on the power supply configuration information, and
   send the message that makes a proposal to charge the vehicle from the priority charger.

4. The server according to claim 3, wherein the processor is configured to exclude a charger installed in a region with a highest fossil energy from the priority charger based on the power supply configuration information.

5. The server according to claim 1, wherein:
the processor is configured to
   further acquire, for each of the plurality of chargers, power supply configuration information of a region in which the charger is installed, and
   extract, from among the plurality of chargers, a charger installed in a region with a highest natural fluctuating power supply as the priority charger based on the power supply configuration information.

6. The server according to claim 1, wherein:
the processor is configured to
   further acquire, for each of the plurality of chargers, weather information of a region in which the charger is installed, and
   extract, from among the plurality of chargers, a charger installed in a region with a greater amount of solar radiation or a higher wind velocity than another region as the priority charger.

7. The server according to claim 1, wherein:
the processor is configured to further acquire, for each of the plurality of chargers, weather information of a region in which the charger is installed, and extract, from among the plurality of chargers a charger installed in a region with a greater fluctuation in an amount of solar radiation or a greater fluctuation in a wind velocity than another region as the priority charger.

8. The server according to claim 1, wherein:
the processor is configured to further acquire, for each of the plurality of chargers, sightseeing information of a region in which the charger is installed, and extract, from among the plurality of chargers, a charger installed in a region closer to a recommended sightseeing area than another region as the priority charger.

9. The server according to claim 1, wherein the processor is configured to send the message such that the message is displayed on at least one of a display mounted on the vehicle or a user equipment owned by the user.

10. A method of adjusting demand or supply of electric power with a computer, the method comprising:

acquiring, for each of a plurality of chargers, power supply and demand information relating to demand or supply of electric power in a power grid of a region in which the charger is installed;

determining a priority of each of the plurality of chargers based on predetermined information including the power supply and demand information relating to demand or supply of electric power in the ower grid of a region in which the charger is installed, extracting, from among the plurality of chargers, a priority charger whose priority rank is higher than or equal to a predetermined rank; and sending a user of a vehicle a message that makes a proposal to charge or discharge the vehicle using the extracted priority charger.

* * * * *